(12) United States Patent
Motoki et al.

(10) Patent No.: US 8,154,848 B2
(45) Date of Patent: Apr. 10, 2012

(54) MULTILAYER CERAMIC ELECTRONIC COMPONENT INCLUDING EXTERNAL ELECTRODES THAT INCLUDE A PLATING LAYER HAVING A LOW FILM STRESS

(75) Inventors: Akihiro Motoki, Fukui (JP); Makoto Ogawa, Fukui (JP); Shunsuke Takeuchi, Echizen (JP); Kenichi Kawasaki, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 454 days.

(21) Appl. No.: 12/354,026

(22) Filed: Jan. 15, 2009

(65) Prior Publication Data
US 2009/0268374 A1 Oct. 29, 2009

(30) Foreign Application Priority Data
Apr. 25, 2008 (JP) ................. 2008-115830

(51) Int. Cl.
H01G 4/228 (2006.01)
H01G 4/06 (2006.01)
(52) U.S. Cl. .................. 361/306.1; 361/321.2
(58) Field of Classification Search ............... 361/321.2, 361/306.1
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,329,976 B2 | 2/2008 | Shirasu et al. | |
| 7,344,981 B2 | 3/2008 | Ritter et al. | |
| 7,345,868 B2* | 3/2008 | Trinh | 361/306.3 |
| 7,463,474 B2 | 12/2008 | Ritter et al. | |
| 7,656,677 B2* | 2/2010 | Ogawa et al. | 361/760 |
| 2005/0046536 A1 | 3/2005 | Ritter et al. | |
| 2006/0245141 A1* | 11/2006 | Shirasu et al. | 361/303 |
| 2007/0014075 A1 | 1/2007 | Ritter et al. | |
| 2007/0145523 A1* | 6/2007 | Chow et al. | 257/528 |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

| | | | |
|---|---|---|---|
| JP | 63-169014 A | | 7/1988 |
| JP | 03029307 A | * | 2/1991 |
| JP | 2002-170733 A | | 6/2002 |
| JP | 2007239076 A | * | 9/2007 |

* cited by examiner

*Primary Examiner* — Eric Thomas
*Assistant Examiner* — David M Sinclair
(74) *Attorney, Agent, or Firm* — Keating & Bennett, LLP

(57) ABSTRACT

A multilayer ceramic electronic component includes a laminate including a stack of a plurality of ceramic layers and a plurality of internal electrodes extending along interfaces between the ceramic layers, and a plurality of external electrodes electrically connecting the internal electrodes exposed at surfaces of the laminate. Each external electrode includes a plating layer at least at the portion directly connected to the internal electrodes. The plating layer has a compressive film stress of about 100 MPa or less or a tensile film stress of about 100 MPa or less.

4 Claims, 4 Drawing Sheets

MULTILAYER CERAMIC ELECTRONIC COMPONENT INCLUDING EXTERNAL ELECTRODES THAT INCLUDE A PLATING LAYER HAVING A LOW FILM STRESS

BACKGROUND OF THE INVENTION

1. Field of the Invention

The present invention relates to a multilayer ceramic electronic component, and more particularly to an external electrode of the multilayer ceramic electronic component.

2. Description of the Related Art

A multilayer ceramic capacitor, which is a known multilayer ceramic electronic component, includes a laminate including a stack of a plurality of dielectric ceramic layers and a plurality of internal electrodes extending along interfaces between the dielectric ceramic layers, and a plurality of external electrodes each electrically connecting the internal electrodes exposed at a surface of the laminate. Such a known multilayer ceramic capacitor is shown in FIG. 4.

According to FIG. 4, the external electrodes are respectively formed on the surfaces of the laminate 102 at which the internal electrodes 104 and 105 are exposed, and thus are electrically connecting the internal electrodes 104 or 105. In order to form the external electrodes, in general, a metal paste including a metal component and a glass component is applied on the surfaces at which the internal electrodes are exposed. Subsequently, the coatings are fired, thereby forming paste electrode layers 106 and 107.

Then, Ni-based first plating layers 108 and 109 are formed over the surfaces of the paste electrode layers 106 and 107, respectively, and then Sn-based second plating layers 110 and 111 are formed over the surfaces of the respective first plating layers 108 and 109. Thus, the external electrode has a three-layer structure including the paste electrode layer, the first plating layer, and the second plating layer.

The external electrode is required to have high solder wettability when the multilayer ceramic capacitor is mounted on a substrate with a solder. In addition, the external electrode is arranged to electrically connect the electrically isolated internal electrodes to each other. The Sn-based second plating layers 110 and 111 have sufficient solder wettability, and the paste electrode layers 106 and 107 electrically connect the internal electrodes. The first plating layers 108 and 109 functions as the respective underlayers of the second plating layers 110 and 111 to prevent corrosion by the solder used for mounting.

Unfortunately, the paste electrode layers 106 and 107 have a relatively large thickness in the range of several tens of nanometers to several hundred of nanometers. In order for the dimensions of the multilayer ceramic capacitor to satisfy certain specifications, the effective volume of the paste electrode layer must be reduced to ensure a sufficient capacitance while the volume of the paste electrode layer is maintained. On the other hand, the plating layers 110 and 111 have a thickness as small as several micrometers. If the external electrode can be defined by only the first plating layer and the second plating layer, a greater effective volume can be provided.

For example, Japanese Unexamined Patent Application Publication No. 63-169014 discloses a technique of depositing an electroconductive metal layer by electroless plating over substantially the entire side surfaces of a laminate at which internal electrodes are exposed, thereby short-circuiting the internal electrode layers at the internal electrode-exposed side surfaces.

In general, a plating layer formed by plating has a specific film stress, that is, a compressive stress or a tensile stress. To produce a multilayer ceramic electronic component including at least a plating layer, as disclosed in Japanese Unexamined Patent Application Publication No. 63-169014, the effect of the film stress of the plating layer should be taken into account.

For example, Japanese Unexamined Patent Application Publication No. 2002-170733 discloses a ceramic electronic component including a ceramic electronic component body, paste-type external electrodes provided on surfaces of the body, and a Ni plating layer provided on each external electrode. Japanese Unexamined Patent Application Publication No. 2002-170733 describes that when the film stress of the Ni plating layer is 50 kgf/mm$^2$ or less (i.e., 490 MPa or less), the ceramic component is not likely to crack even if a thermal stress or mechanical stress is applied.

It has however been discovered that when a plating layer is directly formed on the surface of the ceramic stack at which the internal electrodes are exposed, without disposing a paste electrode layer between the surface of the ceramic stack and the plating layer, as disclosed in Japanese Unexamined Patent Application Publication No. 63-169014, the film stress of the plating layer as disclosed in Japanese Unexamined Patent Application Publication No. 2002-170733, that is, 490 MPa, is not sufficient and may result in problems.

More specifically, when the film stress of the plating layer is compressive, that is, when the plating layer tends to extend in the horizontal direction, many swellings disadvantageously occur at the surface of the plating layer. This is likely due to the fact that the plating layer is formed on a significantly uneven surface at which ceramic and the internal electrodes are present together, and consequently, the compressive stress is difficult to reduce.

When the film stress of the plating layer is tensile, that is, when the plating layer tends to shrink in the horizontal direction, the adhesion to the ceramic stack of the end of the plating layer may be reduced to cause a connection failure with the internal electrodes. This is likely due to the fact that the plating layer is formed on a significantly uneven surface at which ceramic and the internal electrodes are present together, and consequently, the adhesion of the plating layer is reduced.

SUMMARY OF THE INVENTION

To overcome the problems described above, preferred embodiments of the present invention provide a multilayer ceramic electronic component including external electrodes, each including at least one plating layer having a very low film stress and having a high effective volume fraction, superior appearance, and superior reliability.

According to a preferred embodiment of the present invention, a multilayer ceramic electronic component is provided which includes a laminate and a plurality of external electrodes. The laminate includes a stack of a plurality of ceramic layers, and a plurality of internal electrodes extending along interfaces between the ceramic layers and exposed at surfaces of the laminate. The external electrodes electrically connect the internal electrodes at the surfaces at which the internal electrodes are exposed. Each external electrode includes a first plating layer at least at the portion directly connected to the internal electrodes. The first plating layer has a compressive film stress of about 100 MPa or less or a tensile film stress of about 100 MPa or less, for example.

Preferably, the first plating layer is primarily made of Ni or Cu, for example.

Preferably, the first plating layer is formed by electroplating, for example.

The external electrode may preferably further include another plating layer disposed on the first plating layer.

Since the external electrode is substantially made of at least one plating layer, the ceramic electronic component has a superior effective volume fraction. When the film stress of the plating layer is compressive, the compressive film stress is about 100 MPa or less. Consequently, the swelling at the surface of the plating layer, which is difficult to prevent in the known external layer, can be effectively prevented. When the film stress of the plating layer is tensile, the tensile film stress is about 100 MPa or less. Consequently, a connection failure with the internal electrodes, which is difficult to prevent in the known external layer, can be effectively prevented.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
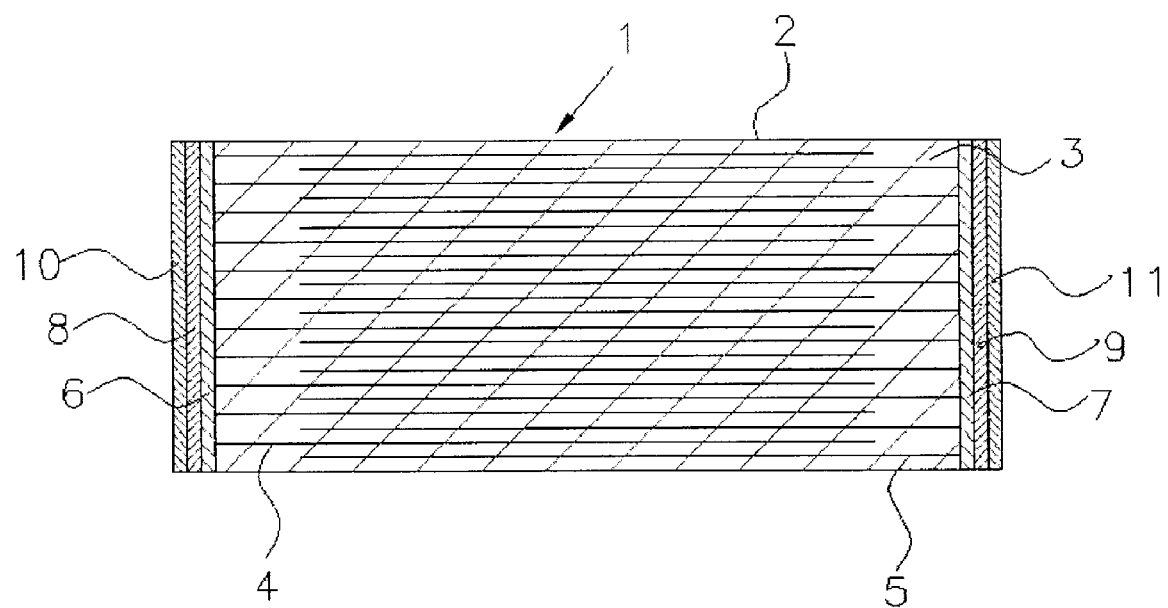
FIG. 1 is a sectional view of a multilayer ceramic capacitor according to a preferred embodiment of the present invention.

In various preferred embodiments of the present invention, the external electrode includes a plating layer directly formed on the surface at which the internal electrodes are exposed without forming a paste electrode layer, a sputter electrode layer, a vapor-deposited electrode layer, or any other suitable interlayer of the external electrode. FIG. 1 shows a multilayer ceramic capacitor, which is a type of multilayer ceramic electronic component, according to a preferred embodiment of the present invention.

The multilayer ceramic capacitor 1 shown in FIG. 1 includes a laminate 2 including a stack of a plurality of dielectric ceramic layers 3 and a plurality of internal electrodes 4 and 5 extending along interfaces between the dielectric ceramic layers, and external electrodes electrically connecting the internal electrodes 4 or 5 exposed at the respective surfaces of the laminate 2. To form the external electrodes, first, first plating layers 6 and 7 are formed on the respective surfaces at which the internal electrodes 4 and 5 are exposed. Then, second plating layers 8 and 9 that are resistant to solder corrosion are optionally formed on the first plating layers 6 and 7, respectively, and third plating layers 10 and 11 that ensure sufficient solder wettability are optionally formed on the first plating layers 6 and 7 or the second plating layers 8 and 9. The second plating layers 8 and 9 may preferably be made of Ni, for example, and the third plating layers 10 and 11 may preferably be made of Sn or Au, for example. The external electrode does not necessarily have such a three layer structure, and may be defined by a single layer or two layers according to the intended application.

In the present preferred embodiment, the first plating layers 6 and 7 preferably have a very low film stress. When the film stress of the first plating layer is compressive, the compressive stress is about 100 MPa or less. When the film stress is tensile, the tensile stress is about 100 MPa or less. In the multilayer ceramic capacitor shown in FIG. 1, only the first plating layers 6 and 7 may cause a problem with film stress. The second plating layers 8 and 9 and the third plating layers 10 and 11 do not produce any significant film stress. If a film stress is produced, it is so low as not to adversely affect the ceramic stack.

The principal component of the first plating layer is not particularly limited. From the standpoint of uniform coatability of the first plating layer on the elementary ceramic body, however, Cu or other suitable material is preferably used, for example. From the standpoint of solder corrosion resistance, Ni is preferably used, for example. In addition, the film stresses of a Cu layer and a Ni layer are easily controlled by including an additive to the plating bath.

Preferably, the first plating layer is formed by electroplating, which is performed by applying an electric current. In this situation, at least a portion of the surface to be plated must be electroconductive, and the exposed ends of the internal electrodes are preferably used as the electroconductive portion. Alternatively, metal particles may be deposited in advance on the surface to be plated instead of using the exposed ends of the internal electrodes.

A method for manufacturing a ceramic electronic component according to a preferred embodiment of the present invention will now be described with reference to the multilayer ceramic capacitor shown in FIG. 1.

In the laminate 2 before plating, the exposed internal electrodes 4 and 5 are electrically isolated from one another. First, electroplating is performed to deposit the metal included in the plating solution on the surfaces at which the inner electrodes 4 and 5 are exposed. The plating deposit is further grown, so that the deposits on the exposed portions of adjacent internal electrodes 4 or 5 are connected to each other. This process is continued until the internal electrode-exposed surfaces are covered with the deposit, thereby forming close and uniform first plating layers 6 and 7 directly on the surfaces.

The plating layer of the present preferred embodiment is formed by the growing force of the plating deposit and its high malleability. For electroplating, the thickness of each dielectric ceramic layer 3 is preferably about 10 μm or less, for example. Such a thickness facilitates the connection between the grown plating deposits.

If the internal electrodes 4 and 5 are recessed from the internal electrode-exposed surfaces, the depth of the recess is preferably about 1 μm or less, for example. If the recess has a depth of more than about 1 μm, electrons are not easily supplied to the exposed portions of the internal electrodes 4 and 5, and consequently, the plating metal is not easily deposited. In order to reduce the depth of the recess, the surfaces can preferably be ground by sandblasting or barreling.

Preferably, the internal electrodes 4 and 5 protrude from the internal electrode-exposed surfaces before plating. Although this is achieved by appropriately controlling the grinding conditions (for example, sandblasting conditions), the grinding extends the protruding portions of the internal electrodes 4 and 5 in the direction parallel or substantially parallel to the plated surface. Consequently, the plating deposits on the ends of the internal electrodes are inhibited from growing to connect with the adjacent plating deposits. In this instance, the thickness of each dielectric ceramic layer 3 is preferably about 20 μm or less, for example. Such a thickness facilitates the connection between the grown deposits.

The second plating layers 8 and 9 and the third plating layers 10 and 11 can be easily formed on the first plating layers 6 and 7 by general electroplating.

An electroplating process will now be described as an example of the plating process for forming the plating electrodes.

For electroplating, the laminate before forming the external electrodes and an electroconductive medium are disposed in, for example, a vessel equipped with power supply terminals. The vessel is immersed in a plating bath including a type of metal ion or a metal complex and a current is applied to the vessel while the vessel is rotated, swung, or vibrated, for example.

The plating bath may include an additive to adjust the film stress when the metal is deposited by applying a current. A commercially available additive may preferably be used, for example. The film stress is controlled in a predetermined range by adding an additive and controlling other conditions, such as temperature and pH.

The film stress may preferably be adjusted after forming the first plating layers 6 and 7 by heat treatment.

Although the external electrode of the ceramic electronic component of the present preferred embodiment primarily includes plating layers, a paste electrode may be provided in a portion not directly involved with the connection of the plurality of internal electrodes. For example, if the external electrode is formed so as to extend to the surfaces adjacent to the internal electrode-exposed surface, a thick paste electrode layer may preferably be formed, for example. The thick paste electrode layer effectively facilitates solder mounting and prevents the permeation of water from the ends of the plating layer.

The resulting ceramic electronic component is typically used as a multilayer ceramic capacitor, and may be used as a multilayer chip inductor, a multilayer chip thermistor, and other suitable components. Thus, any ceramic may be used as long as the ceramic layers are electrically isolated from each other. For example, a piezoelectric ceramic, a semiconductor ceramic, and a magnetic ceramic may preferably be used without being limited to dielectric ceramics, and the ceramic may preferably include a resin. The present preferred embodiment may be applied to simple ceramic electronic components which do not include internal electrodes without being limited to the electronic component having a multilayer structure.

While the multilayer ceramic capacitor shown in FIG. 1 includes a pair of external electrodes, a plurality of pairs of external electrodes (arrayed type) may preferably be provided.

Preparation of Multilayer Ceramic Capacitor Samples

Examples of the multilayer ceramic electronic component according to a preferred embodiment of the present invention will now be described. In the following examples, first plating layers having different film stresses were formed on a specific laminate, and the effects of the different film stress were evaluated. In the examples, the second and third plating layers are not formed.

A laminate of about 1.90 mm in length by about 1.05 mm in width by about 1.05 mm in thickness for a multilayer ceramic capacitor was prepared. The dielectric ceramic layers were made of a barium titanate-based dielectric material, and the internal electrodes were made of a Ni-based material. Each dielectric ceramic layer between two adjacent internal electrodes had a thickness of about 1.0 μm, and each internal electrode layer had a thickness of about 0.8 μm. The number of internal electrode layers was 420.

After being dried, the laminate was subjected to sandblasting with an abrasive so that the height of the protrusions of the internal electrodes from the internal electrode-exposed surfaces was about 1 μm on average.

Then, 500 laminates and about 100 mL of steel balls having a diameter of about 1.3 mm were placed in a 300 mL rotation barrel.

In addition, a Ni electroplating bath and a Cu electroplating bath were prepared. The Ni electroplating bath was a Watts solution primarily including nickel sulfate, nickel chloride, and boric acid and having a pH of about 4.2 and a temperature of about 60° C. Additives for Sample Numbers 1 to 11 shown in Table 1 were added in the proportions shown in Table 1 to the respective watts solutions. Thus, plating baths were prepared for Samples 1 to 11.

The other plating bath was a Cu electroplating bath produced by Uemura Kogyo, primarily including copper pyrophosphate and having a pH of about 8.7 and a temperature of about 25° C. Additives for Sample Numbers 14 to 17 shown in Table 1 were added in the proportions shown in Table 1 to the respective Cu electroplating solutions. Thus, plating baths were prepared for Samples 14 to 17.

The rotation barrel was immersed in each plating bath, and a current was applied at a current density of about $0.18 A/dm^2$ while the barrel was rotated at a peripheral speed of about 2.6 m/minute. Thus, an approximately 6 μm Ni plating layer or Cu plating layer was formed on the internal electrode-exposed surfaces of each laminate.

The laminates for each sample were removed from the rotation barrel. For Samples 10 and 11, 500 laminates for each sample were divided into two groups, and one group was heat-treated in a nitrogen atmosphere at about 800° C. for about 2 hours. The heat treated groups were used as Samples 12 and 13, respectively. The other groups not subjected to heat treatment were used as Samples 10 and 11. The multilayer ceramic capacitor samples 1 to 17 were thus prepared for evaluation.

TABLE 1

| Sample No. | Metal | Product name of additive | Constituents | Content | Distributor | Remarks |
|---|---|---|---|---|---|---|
| 1 | Ni | NL-BL | NL-BL | 3 mL/L | Ebara-Udylite | |
| | | | #82 | 2 mL/L | | |
| 2 | Ni | Pikateru PK-01 BL | PK-mu | 15 mL/L | Ebara-Udylite | |
| | | | PK-CL | 0.5 mL/L | | |
| | | | PK-01 BL | 0.2 mL/L | | |
| | | | #62 | 2 mL/L | | |
| 3 | Ni | M&T Trolume 2KL | A-5 | 30 mL/L | Atotech Japan | |
| | | | SA-1 | 3 mL/L | | |
| | | | Trolume 2KL | 0.5 mL/L | | |
| | | | Y-17 | 1 mL/L | | |
| 4 | Ni | Levenon A | Levenon A | 10 mL/L | Nikko Shoji | |
| 5 | Ni | Levenon Y | Levenon Y | 10 mL/L | Nikko Shoji | |
| 6 | Ni | Levenon S | Levenon S | 15 mL/L | Nikko Shoji | |

TABLE 1-continued

| Sample No. | Metal | Product name of additive | Constituents | Content | Distributor | Remarks |
|---|---|---|---|---|---|---|
| 7 | Ni | High Nickel VL | High Nickel VL-1 | 20 mL/L | Shimizu | |
| | | | High Nickel VL-2 | 0.05 mL/L | | |
| 8 | Ni | High Nickel FBN-01 | FBN-01 Make | 20 mL/L | Shimizu | |
| | | | FBN-01X | 0.5 mL/L | | |
| 9 | Ni | none | — | — | — | |
| 10 | Ni | Nickel Ace | NA-1000 | 30 mL/L | Murata | |
| | | | NA-2000 | 1 mL/L | | |
| | | | NP-A | 3 mL/L | | |
| 11 | Ni | Mark 80 | M-801 | 4 mL/L | Murata | |
| | | | M-802 | 1 mL/L | | |
| | | | NP-A | 3 mL/L | | |
| 12 | Ni | Nickel Ace | NA-1000 | 30 mL/L | Murata | Heat-treated |
| | | | NA-2000 | 1 mL/L | | |
| | | | NP-A | 3 mL/L | | |
| 13 | Ni | Mark 80 | M-801 | 4 mL/L | Murata | Heat-treated |
| | | | M-802 | 1 mL/L | | |
| | | | NP-A | 3 mL/L | | |
| 14 | Cu | Pyrobright PY-61 | Pyrobright PY-61 | 0.3 mL/L | Uemura Kogyo | |
| 15 | Cu | Pyrodone CP-2 | Pyrodone CP-2 | 3 mL/L | Murata | |
| 16 | Cu | Pyrotop PB | Pyrotop PB | 1 mL/L | Okuno Chemical | |
| 17 | Cu | KAPY-3M | KAPY-3M | 3 mL/L | Kinzokukakou Gijutu Kenkyujo | |

Measurements of Samples

The resulting multilayer ceramic capacitor samples were subjected to measurements for the film stress of the Ni plating layer or the Cu plating layer by a side inclination method using a micro-X-RAY diffraction apparatus (μ-XRD) having a collimator diameter of about 500 μm. Table 2 shows the film stresses of the Samples 1 to 17. In Table 2, negative values of the film stress means that the film stress was compressive, and positive values of the film stress means that the film stress was tensile.

Then, multilayer ceramic capacitor samples 1 to 17 were subjected to the following test of the connection between the Ni or Cu plating layer and the internal electrodes. More specifically, each sample was maintained at about 150° C. for about 60 minutes and allowed to stand at room temperature for about 22 hours. Then, the initial capacitance was measured. Subsequently, a sequence of applying a voltage of about 40 V to the sample for about 5 seconds and then short-circuiting the sample were performed 5 times. Then, after the sample was maintained at about 150° C. for about 60 minutes and allowed to stand at room temperature for about 22 hours, the capacitance was measured. The chips whose capacitance after the test varied by at least about 1% from the initial capacitance were determined to be defective. This test was performed on 100 samples of each sample number. The percentage of defects is shown in Table 2.

Then, the surfaces of the Ni or Cu plating layers of the multilayer ceramic capacitor samples 1 to 17 were observed to check for swellings. The chips in which at least one swelling of at least about 10 μm in diameter were found were determined to be defective. Table 2 shows the percentage of defects obtained from the observation of 100 samples for each sample number.

TABLE 2

| | Film stress (MPa) | Occurrence of connection failure (%) | Occurrence of swelling in plating layer (%) |
|---|---|---|---|
| 1 | −39.0 | 0 | 0 |
| 2 | −21.0 | 0 | 0 |
| 3 | −31.0 | 0 | 0 |
| 4 | −20.0 | 0 | 0 |
| 5 | −37.0 | 0 | 0 |
| 6 | −34.0 | 0 | 0 |
| 7 | −32.0 | 0 | 0 |
| 8 | −45.0 | 0 | 0 |
| 9 | 120.0 | 40 | 0 |
| 10 | 163.0 | 50 | 0 |
| 11 | 348.0 | 100 | 0 |
| 12 | 41.0 | 0 | 0 |
| 13 | 92.0 | 0 | 0 |
| 14 | −52.0 | 0 | 0 |
| 15 | −100.0 | 0 | 0 |
| 16 | −130.0 | 0 | 60 |
| 17 | −170.0 | 0 | 90 |

Evaluation of Measurement Results

Figure 2:
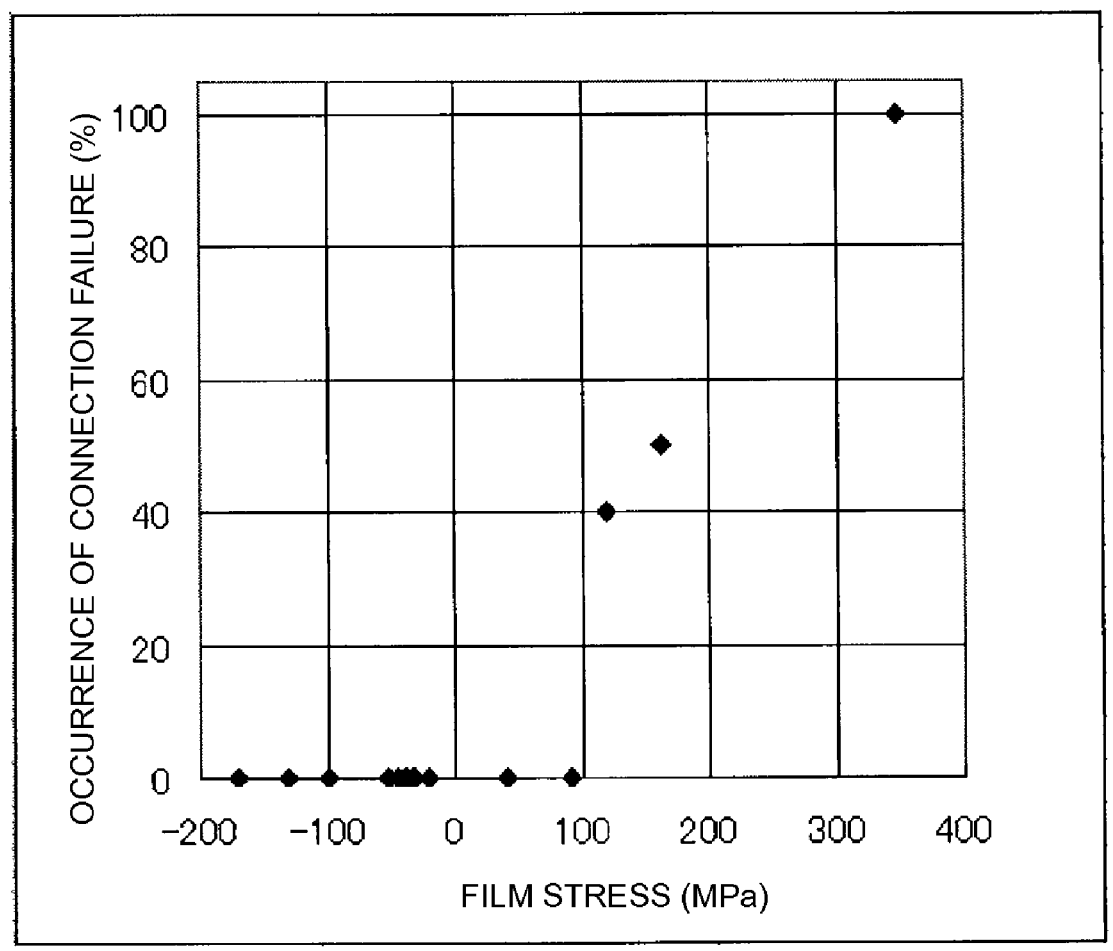
FIG. 2 is a plot of the occurrences of connection failure in relation to film stress.
Figure 3:
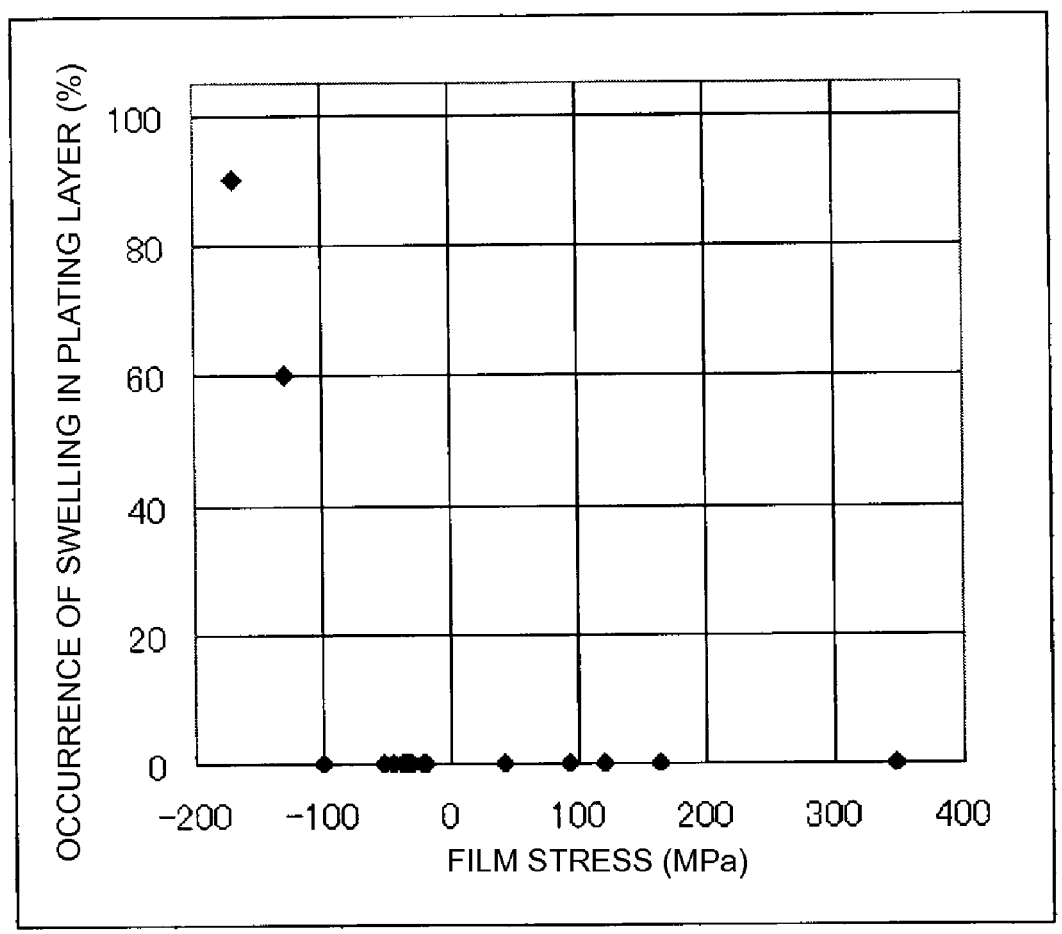
FIG. 3 is a plot of the occurrences of swelling in the plating layer in relation to film stress.
Figure 4:
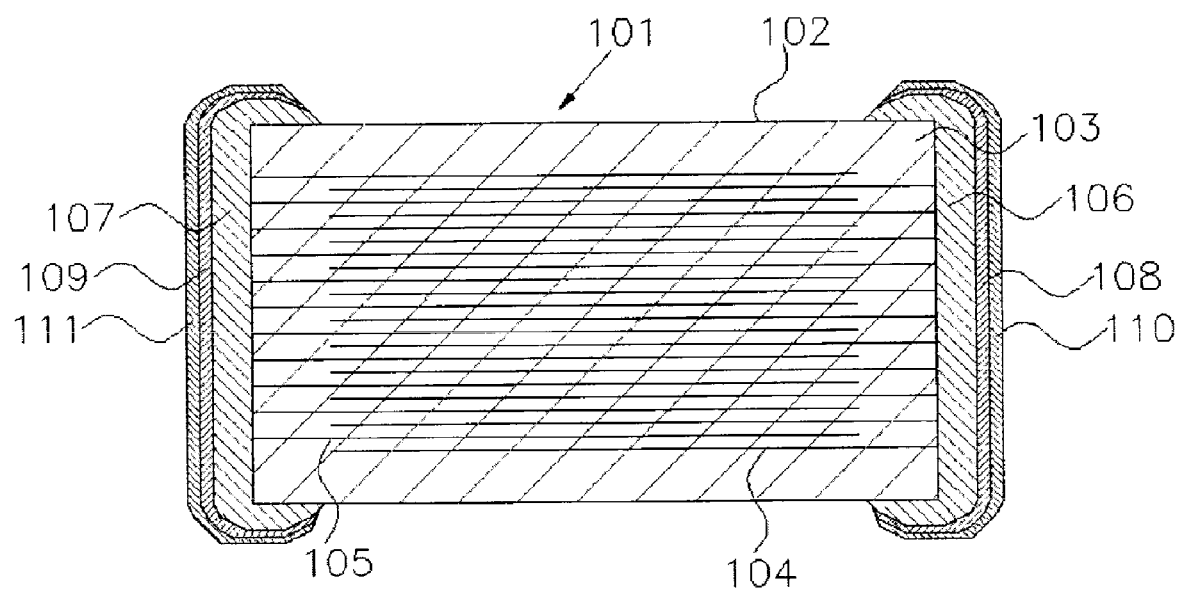
FIG. 4 is a sectional view of a known multilayer ceramic capacitor.

FIG. 2 shows the changes of the occurrence of connection failure in relation to the film stress shown in Table 2. FIG. 3 shows the changes of the occurrence of swelling in relation to the film stress.

It was determined from FIG. 2 that while compressive stress does not affect the connection, a tensile stress of more than about 100 MPa rapidly increases the occurrence of connection failure.

It is also found from FIG. 3 that while tensile stress does not cause swelling, a compressive stress of more than about 100 MPa rapidly increases the occurrence of swelling in the plating layer.

As described above, when the plating layer is directly formed on the internal electrode-exposed surface of a ceramic stack without providing a paste electrode layer therebetween, the film stress of the plating layer affects the reliability of the resulting multilayer ceramic electronic component to a greater extent. In particular, a compressive stress or tensile stress of about 100 MPa is the critical point at which defects are produced.

While preferred embodiments of the invention have been described above, it is to be understood that variations and modifications will be apparent to those skilled in the art without departing the scope and spirit of the invention. The scope of the present invention, therefore, is to be determined solely by the following claims.

What is claimed is:

1. A multilayer ceramic electronic component comprising:
    a laminate including a stack of a plurality of ceramic layers, and a plurality of internal electrodes extending along interfaces between the plurality of ceramic layers and exposed at surfaces of the laminate; and
    a plurality of external electrodes electrically connecting the internal electrodes at the surfaces at which the internal electrodes are exposed; wherein
    each of the plurality of external electrodes includes a first plating layer at least at the portion directly connected to the internal electrodes; and
    the first plating layer has a compressive film stress of about 100 MPa or less or a tensile film stress of about 100 MPa or less.

2. The multilayer ceramic electronic component according to claim 1, wherein the first plating layer primarily includes Ni or Cu.

3. The multilayer ceramic electronic component according to claim 2, wherein the first plating layer is defined by an electroplated layer.

4. The multilayer ceramic electronic component according to claim 1, wherein the external electrode further includes another plating layer on the first plating layer.

* * * * *